A. SHARP.
AIR SPRING.
APPLICATION FILED OCT. 9, 1908.

973,223.

Patented Oct. 18, 1910.
2 SHEETS—SHEET 1.

Witnesses:
E. M. Morgan.
M. E. Ruebush.

Inventor:
Archibald Sharp
By
Attorney

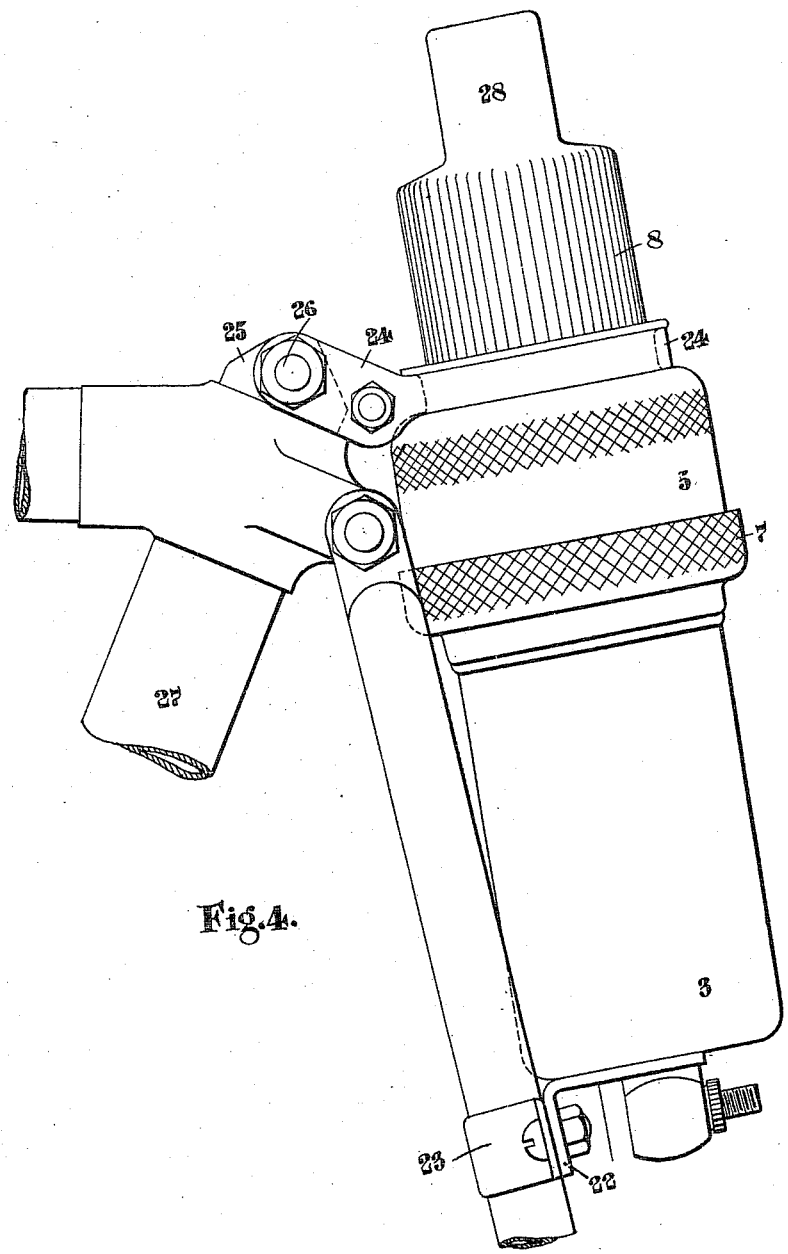

UNITED STATES PATENT OFFICE.

ARCHIBALD SHARP, OF WESTMINSTER, LONDON, ENGLAND.

AIR-SPRING.

973,223.

Specification of Letters Patent. Patented Oct. 18, 1910.

Application filed October 9, 1908. Serial No. 456,961.

*To all whom it may concern:*

Be it known that I, ARCHIBALD SHARP, subject of Great Britain, residing at 231 Strand, in the city of Westminster, in the county of London, England, have invented new and useful Improvements in Air-Springs, of which the following is a specification.

This invention relates to improvements in air springs of the type described in British patent specification No. 4201 of the year 1906. Its object is to provide a method of constructing the apparatus whereby brazed joints and castings shall be avoided in all parts subjected to air pressure, as it is found that brazed joints and castings cannot be relied upon to be absolutely air-tight under the high pressure used in the apparatus.

The improvements also relate to various external attachments for the air springs, to adapt them for the various purposes for which they may be used.

Figure 1:
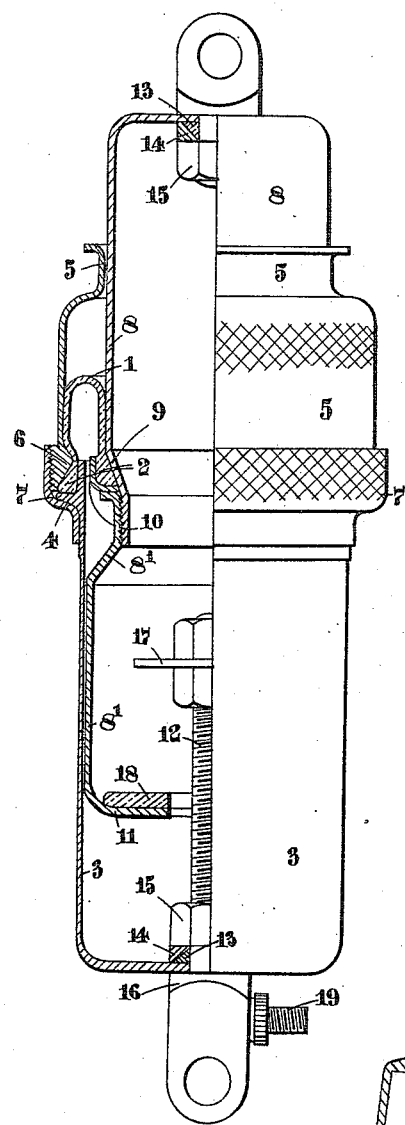
Figure 2:
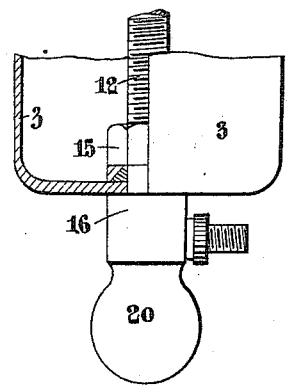
Figure 3:
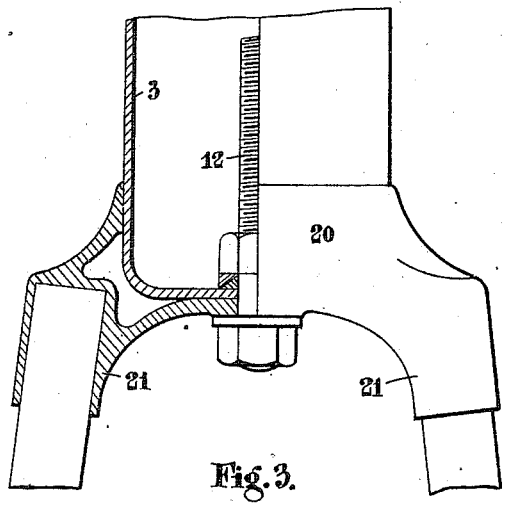

Figure 1 is a view partly in section showing the arrangement of the parts of the air spring. Fig. 2 is a view partly in section and partly in elevation of a slightly modified form of the invention. Fig. 3 is a view partly in section and partly in elevation showing the application of my invention to a portion of a bicycle. Fig. 4 is a view in elevation of the device of my invention applied to the rear portion of a bicycle adjacent seat post.

The rolling packing mitten 1 is made as heretofore, with thickened ends 2. The cylinder 3 is made preferably a deep drawing from sheet steel, closed at one end, of uniform bore throughout its length, except for a short distance at its mouth which may be of slightly larger diameter. The large end of the mitten forms an air-tight joint with the outside of the mouth of the cylinder. For this purpose a washer is permanently attached to the outside of the cylinder a short distance from its mouth to serve as an external flange for the end of the mitten to rest against. Or the said external flange 4 may be formed by spinning, pressing or similar operations on the cylinder itself. A tubular cap 5 (which may be of larger diameter than the cylinder) with tapered mouth 6, is screwed hard up against the said external flange by means of a ring nut 7. The thickened end of the mitten is lodged in the space between the tapered mouth of the tubular cap and the outside of the cylinder end, so as to make an air-tight joint between the cylinder and the end of the mitten. The rolling packing mitten rolls from the inside surface of the said tubular cap and the surface of the plunger 8, the said tubular cap being contracted in diameter at its outer end to serve as a guide for the plunger.

The plunger, to which the small end of the rolling packing mitten is fastened, is made in two tubular pieces 8 and 8' drawn from sheet steel, screwed together, the parts being so shaped as to secure the small end of the mitten. The inner tubular piece 8' is an easy sliding fit in the cylinder 3, the outer piece 8 is of smaller diameter, closed at its outer end, and passes out and through the aforesaid tubular cap 5. The open end of the outer tubular piece is contracted in diameter, and a screw thread is cut on the end. A short tapered part 9 forms the surface with which the small thickened end of the mitten makes an air-tight joint, the said thickened end being confined by a retaining ring 10 of L section. The aforesaid inner tubular piece 8' is screwed on to the end of the outer tubular piece 8, fastening the retaining ring and thickened end of the mitten. The end of the inner tubular piece toward the closed end of the cylinder is flanged inward as at 11.

To limit the outward travel of the plunger when air is pumped into the cylinder, a "retaining bolt" 12 co-axial with the cylinder and plunger is fastened to the closed end of the cylinder which is bored to fit the retaining bolt. A leather or rubber washer 13, is pressed between a washer 14 or a shoulder on the retaining bolt and the inner surface of the cylinder end by means of a nut screwed on the end of the retaining bolt projecting outside the cylinder as shown in Fig. 3, the said washer making the joint air-tight. Or the said nut 15 may be inside the cylinder, and the said shoulder 16 on the retaining bolt outside, as shown in Fig. 1. The retaining bolt is prolonged inside the cylinder passing through a hole bored in the flanged end 11 of the plunger, and a large washer 17 of less diameter than the bore of the plunger, is fastened to its end. A rubber ring 18 may be inserted between the said washer and the closed end of the plunger to deaden metallic shock when the plunger comes to the outer end of its stroke.

The valve, of any convenient type, through which the air is pumped into the cylinder may be attached in any convenient position. The valve 19 may be conveniently combined with the outer end of the retaining bolt, which will be bored for part of its length shown in Figs. 1 and 2.

For use on a motor car, it is desirous that in the event of the mitten having become porous the complete air spring should be easily removed, and another air spring substituted. The cylinder of the air spring may then have its closed end of spherical shape, and bear against a cup fixed to the chassis frame. The closed end of the plunger may rest direct in a socket fastened to the axle or axle case. Or the spherical part 20 may be made integral with the shouldered end of the retaining bolt 12 as shown in Fig. 2. The air pressure in the spring and the weight of the car will then normally keep the spring in position. On jacking up the chassis from the axle, and deflating the air spring, it can be removed. Or separate attachment pieces for any arrangement of fixing can be brazed or otherwise fastened to the outside of the cylinder and plunger ends respectively.

When the air spring is to be combined with the fork of a cycle, the closed end of the cylinder or plunger may be brazed into a crown 21, to which is brazed the two ends of the fork sides. Or the air spring may be detachably fastened to the crown 21, and secured by a nut. Or the nut fastening the retaining bolt of the air spring may also be used to fasten the air spring to the crown 21, as shown in Fig. 3. In this case the valve is conveniently placed at the outer end of the plunger 8. The valve body fastened to the end of the plunger 8 by a nut and airtight washer, may then be combined with the lug for attaching the air spring to the bicycle frame.

When the air spring is to be used as a seat-pillar to go on an existing bicycle it is secured to the back stays and down tube as shown in Fig. 4. For this purpose, a small bracket of sheet steel 22 is fastened to the cylinder by the retaining bolt and nut, and is fastened to the stays by a clip 23 of the usual type. Another sheet steel bracket 24 is riveted or otherwise fastened to the tubular cap, it being so shaped as to be attached to the end of the usual seat post 25 by a rivet or bolt 26. The seat post is clamped in the usual way in the down tube 27. The end 28 of the plunger is reduced in diameter so as to fit the usual saddle clip, or to take a short horizontal seat stem if desired.

Claims:

1. An air spring comprising in combination, a two part cylinder provided with an open end, a two part piston partially disposed in said cylinder, a rolling packing mitten, means disposed at the juncture of the parts of said cylinder for securing one end of said mitten thereto, means at the juncture of parts of said piston for securing the other end of the mitten thereto, means for admitting air to said cylinder below said mitten, attachment means at the projecting end of said piston for connection with one of the members of the parts to be separated by the spring, and attaching means for said cylinder for connection with another of the parts of the members to be separated by said spring.

2. An air spring comprising in combination, a two part cylinder having one end open, one of the parts having one end closed and the other open and a shoulder formed adjacent the open end, the other part of said cylinder having both ends open, a rolling packing mitten, means for connecting said cylinder parts and securing one end of the packing mitten therebetween, a two part piston oppositely disposed in said cylinder with the projecting end closed and the opposite end open, the adjoining parts of said piston having threaded connection, means disposed at the juncture of said piston parts for frictionally connecting the other ends of said packing mitten thereto, attaching means for the projecting end of said piston for connecting the same with one of the parts to be separated by the spring, attaching means for said cylinders for connecting the same to the other of the parts separated by said spring, and means for admitting air to said cylinders below said mitten.

3. An air spring comprising in combination, a two part cylinder, one part having a closed and an open end and a shoulder adjacent said open end, the other part of said cylinder having both ends open and one end threaded, a packing mitten, one end of the packing mitten being interposed between two parts of said cylinder at the juncture thereof, a rack having threaded engagement with threaded part of said cylinder and frictional engagement with the other part of said cylinder for joining the two parts and securing one end of the mitten therebetween, a two part piston partially disposed in said cylinder and having threaded connection with each other, a ring at the juncture of said threaded connection for connecting said piston with the other end of said mitten, attaching means at the projecting end of said piston for connection with one of the parts to be separated by said spring, attaching means for the cylinder for connection with the other parts to be separated by said spring, and means for admitting air to said cylinder below said mitten.

4. An air spring comprising in combination, a cylinder open at one end and provided on its opposite end with attaching means for connection with one member of the parts separated by the spring, a hollow piston disposed partially in said cylinder and having attaching means on its projecting end for connection with another member of the parts to be separated by the spring, the opposite end of said piston being open and said piston comprising two cylindrical parts disposed in end to end relation, means for securing said piston parts together, a roller packing mitten connected with the interior of the cylinder below the open end thereof and with the exterior of the piston, and means for admitting air to the interior of said cylinder below said mitten.

5. An air spring comprising in combination, a cylinder open at one end and provided on its opposite end with attaching means for connection with one member of the parts separated by the spring, a hollow two part piston disposed partially in said cylinder and having attaching means on its projecting end for connection with another member of the parts to be separated by the spring, the opposite end of said piston being open, a roller packing mitten connected with the interior of the cylinder below the open end thereof, means for securing the packing mitten to said piston and also securing the parts of said piston together, and means for admitting air to the interior of said cylinder below said mitten.

6. An air spring comprising in combination, a cylinder provided with an open end, a two part piston partially disposed in said cylinder, a rolling packing mitten secured to the interior of said cylinder, means at the juncture of parts of said piston for securing the other end of the mitten thereto, means for admitting air to said cylinder below said mitten, attaching means at the projecting end of said piston for connection with one of the members of the parts to be separated by the spring, and attaching means for said cylinder for connection with another of the parts of the members to be separated by said spring.

Dated this 28th day of September, 1908.

In testimony whereof I have signed my name to this specification in the presence of two subscribing witnesses.

ARCHIBALD SHARP.

Witnesses:
   ARTHUR H. STANLEY,
   A. L. ANNISON.